United States Patent [19]
Poncet

[11] Patent Number: 4,559,003
[45] Date of Patent: Dec. 17, 1985

[54] APPARATUS FOR MANUFACTURING WEBS OF POLYMER FOAM AND A PRODUCT OBTAINED

[76] Inventor: Jean Poncet, 4, rue Reine Jeanne, 13100 Aix-en-Provence, France

[21] Appl. No.: 441,514
[22] PCT Filed: Mar. 23, 1982
[86] PCT No.: PCT/FR82/00056
§ 371 Date: Nov. 1, 1982
§ 102(e) Date: Nov. 1, 1982
[87] PCT Pub. No.: WO82/03357
PCT Pub. Date: Oct. 14, 1982

[30] Foreign Application Priority Data
Mar. 24, 1981 [FR] France ............... 81 06043

[51] Int. Cl.⁴ ............................................. B29D 27/04
[52] U.S. Cl. .................................... 425/224; 264/45.8; 264/46.2; 264/46.9; 264/51; 264/DIG. 84; 264/45.3; 425/817 C
[58] Field of Search ............... 264/DIG. 84, 51, 53, 264/45.8, 46.2, 175, 46.9, 45.3; 425/224, 817 C

[56] References Cited
U.S. PATENT DOCUMENTS 3,281,510 10/1966 Lovret ........................ 264/51 X
3,328,503  6/1967 Ancker ........................ 264/175
3,354,244 11/1967 Davidson .................... 264/46.9 X
3,414,641 12/1968 Miller ......................... 264/175 X
3,429,959  2/1969 Salhofer ..................... 264/175
3,478,138 11/1969 Friesner ..................... 264/175 X
3,499,957  3/1970 Ancker ....................... 264/175
3,681,485  8/1972 Lieberman ................. 264/46.2 X
3,730,660  5/1973 Raffenberg .............. 264/46.9 X
3,754,064  8/1973 Snelling et al. .......... 264/46.9 X
3,786,122  1/1974 Berg ......................... 264/DIG. 84
3,912,580 10/1975 Casten ...................... 264/175 X
3,991,151 11/1976 Schiesser ................. 264/175 X
4,074,960  2/1978 Dockray et al. ......... 264/DIG. 84
4,093,109  6/1978 Schrader .................. 264/DIG. 84
4,165,211  8/1979 Ebeling et al. .......... 264/DIG. 84
4,216,181  8/1980 Ebeling et al. .......... 264/DIG. 84
4,306,927 12/1981 Funk et al. ............... 264/175 X
4,363,610 12/1982 Murray et al. ........... 264/DIG. 84

FOREIGN PATENT DOCUMENTS

741836  5/1970 Belgium ................... 264/DIG. 84
000058 12/1978 European Pat. Off. .... 264/DIG. 84
1579795  8/1969 France .
965185  7/1964 United Kingdom ............ 264/46.9

Primary Examiner—Philip Anderson
Attorney, Agent, or Firm—Balogh, Osann, Kramer, Dvorak, Genova & Traub

[57] ABSTRACT

An apparatus for manufacturing continuous webs of polymer foam obtained from a mixture of liquid reagents, wherein the volume of a container is determined to form a zone of retention of the mixture of reagents in liquid phase and wherein the level of this mixture is maintained at a level slightly higher than the plane upon which the mixture in the liquid state flows, so that the primary phase of expansion of the mixture and its further expansion are produced outside the container on a moving surface of the conveyor, which surface is maintained in a substantially horizontal plane. The invention is particularly applicable to the production of webs of supple foam or of panels of rigid foam.

16 Claims, 15 Drawing Figures

FIG. 3

APPARATUS FOR MANUFACTURING WEBS OF POLYMER FOAM AND A PRODUCT OBTAINED

The present invention relates to an apparatus for manufacturing webs of polymer foam and to the product obtained.

The technique sector covered by the invention is that of equipment for making webs of supple or rigid foam.

It is known that, in the process of polyurethane foaming, two simultaneous reactions are produced between, on the one hand the isocyanate and the polyol (or polyalcohol) and on the other hand between the isocyanate and water, which produces the main expanding agent: carbon dioxide gas. This latter reaction, possibly combined with the physical phenomenon of boiling of an auxiliary swelling agent (methylene chloride or trichlorofluomethane) provokes the expansion of the foam. In this way, a porous, thermosetting material is obtained which may either be supple or rigid depending on the degree of cross-linking of the polymer.

Presently known continuous-casting processes consist mainly in distributing as uniformly as possible the liquid reactive mixture over the width of an inclined conveyor, formed by a bottom and two lateral walls which move perpendicularly to the distribution of the liquid. This distribution of a mixture of liquid, only slightly viscous reagents, of rapid reactivity, involves a retention zone capable of containing the liquid poured for the time necessary and sufficient for this operation. In this design, the inclination of the conveyor is generally from 4° to 6° over the length necessary for the expansion of the foam and gelification thereof: between fifteen and twenty meters. Displacement takes place thereafter on a horizontal plane up to the transverse cutting equipment: about fifty meters from the point of casting.

The most conventional devices comprise a casting head adapted to be moved in a transverse to and fro movement and the retention zone of the reagents if formed, upstream, by the bottom of the conveyor, generally constituted by a sheet of supple material: sheet of paper or of polyethylene, laterally by continuously advancing walls constituted by the same material as that of the bottom and, downstream, by the product itself which enters its initial reactive phase, called the "cream line". It is specified that the term "cream line" designates the state of the mixture of the reagents occurring immediately after the liquid phase and in which this mixture attains a high viscosity preceding the formation of the foam. The product in the viscous state adheres to the bottom support and constitutes a constantly renewed barrier to the flow of the liquid mixture along the slope of the conveyor. In order to compensate for the absence of mixture in this state, an obstacle is placed downstream of the casting head at the beginning of manufacture, whose role is to retain the liquid mixture at the start.

On this principle, a process is known, described in French Pat. No. 1 579 795 according to which a transverse element of determined profile is placed beneath the supple support to communicate an ascending movement of said support over a very short distance and thus form the downstream wall of the retention zone. This process makes it possible to improve the distribution of the liquid mixture over the width of the conveyor and to reduce and even eliminate the to and fro movement of the casting head.

This principle is also applied in the process described in French Pat. No. 72 76616 in which a cylindrical bar is used, protected by a supple upper support, for example a web of paper, which laminates the liquid mixture at the precise point of the cream line, thus creating, by a constantly monitored adjustment appropriate to each manufacture, a fragile balance between the arrival of liquid and its evacuation in the expansion zone. According to this process, the downstream wall is formed by the cylindrical bar in combination with the cream line which immediately follows it.

Another known process is described in French Pat. No. 71 31528, which consists in distributing the liquid mixture over the conveyor by means of a container or trough, in which the reagents are introduced through the bottom and where their expansion begins to be produced. The reagents, in the nascent foam state, overflow from this container to pour onto the conveyor.

All these known processes and devices present drawbacks.

In the first three processes mentioned above, the upstream wall is always formed by the bottom of the conveyor which must necessarily be inclined. The main drawback arising out of this design is the difficulty in controlling the parasitic flow of the liquid phase of the reagents, beneath the cream line.

The drawbacks of the last-mentioned process are as follows:

(a) the retention zone, constituted by a static container, is subject to inevitable continual fouling due to the evolutive nature of the mixture;

(b) as the capacity of the container cannot be modified during manufacture, the reactivity of the mixture must consequently be slow without possibility of adapting it to the other imperatives.

(c) the relatively large volume of material contained in the container and the fact that the reaction begins therein are factors of progressive elevation of the temperature in said container, thus modifying the evolution of the conversion of the reactive mixture.

(d) the parasitic flows beneath the expanding foam are not totally eliminated due to the use of an inclined conveyor.

As has just been set forth, the mixture, during its expansion, passes progressively from the liquid state to the solid state, the finished product being rigid or supple as a function of the degree of crosslinking of the polymer. The rapdily viscous then pasty state of the mixture provokes against the walls of the shaper whatever it is (a mould whose top is open or closed) a retaining means which brakes the expansion of the cells coming into contact with the walls.

In the production of blocks or webs of rectangular cross section in particular, this phenomenon results in a rounded form of the upper face of the foam block at the end of expansion. This form is the origin of considerable losses of matter when manufacturing such blocks or webs.

It has therefore been sought to give the section of the continuously cast blocks a shape which is as rectangular as possible.

A known process and device consist in lining the mobile lateral walls with a stretched polyethylene film firstly at an determined angle up to the end of expansion of the foam from which, after formation of a fold, it then accompanies the block of foam until it leaves the conveyor.

According to another process, the foam being formed is compressed with the aid of weights in abutment on the upper face of the block of foam, wia a web of paper or a web of nonwoven fibre, which accompanies the block during its displacement on the conveyor.

Another process described in French Pat. No. 71 31528 consists in placing the casting point substantially at the same height as the upper face of the block to be obtained and expansion of the foam is ensured by the controlled inclination of the conveyor.

These three processes present drawbacks.

The drawbacks of the first process lie in the fact that it requires the use of sheets of a very supple material for deformability thereof. Such a material, preferably polyethylene, is relatively fragile and expensive at the present time since it is a derivative of petroleum.

In addition, the fold formed at the final point of expansion of the foam leaves in the lateral faces of the webs traces which require straightening of the flanks, this involving considerable losses of material.

The drawbacks of the second process are firstly that it requires a complex equipment involving delicate adjustment. Moreover, any variation of the cream line generates an inclusion of air between the web of paper and the upper face of the block, which then presents deep cracks which are sometimes large, thus leading to the loss of part of the web. Likewise according to the process, the upper paper can only be withdrawn after total gelification of the block, i.e. twenty five to thirty meters after casting and consequently the defects are visible to the operators only from that moment, this causing a considerable delay in the correcting manoeuvres.

The drawback of the third process resides in the complexity of the device for varying the width of the web of foam in the course of manufacture.

The plates of rigid foam, of controlled thickness and of which each face is constituted by a protective material paper, fabric, plaster board, wood, etc ... are generally mass-produced, in standard width, preferably of one meter twenty centimeters, by means of horizontal, so-called double belt conveyors, of which the lower belt supports a web which receives the reactive mixture and the other, upper belt, comprises a web which limits the expansion of the product and ensures in addition calibration, evenness of the upper face.

In this type of manufacture, it is useful to be able to adjust the distance between the point of casting, or retention zone, and the point where the expanding mixture enters under the upper conveyor. Similarly, it is necessary to control the temperature of the lower flexible support in the part preceding the entry of the mixture in the passage existing between the upper conveyor and the lower conveyor.

It is an object of the invention to provide means for manufacturing webs of supple or rigid polymers making it possible:

to obtain a retention zone defined with precision by the mechanical elements of the device;
to control, vary and adjust the volume of aid zone depending on the characteristics of the reactive mixture and the product to be manufactured;
to use to these ends a combination of elements having a continuous relative movement therebetween and of which the direction is determined so that the mixture in liquid phase is maintained in this zone, without appreciable leakage, to flow naturally onto the conveyor of which the upstream end constitutes a wall of the retention zone;
to adjust the heights and respective movements of the apparatus so that the flow of the liquid mixture is possible only in the direction of the conveyor without it being necessary to incline said conveyor.

It is a further object of the invention to make webs of supple polymer foam of rectangular cross section whose upper face is flat.

Another object of the invention is the manufacture of plates of loaded and/or light rigid foam, particularly plates comprising in their thickness longitudinal, parallel channels, whilst presently known techniques allow only the production of solid panels of pure material.

These objects are attained by the process according to the invention manufacturing continuous webs of polymer foam obtained from a mixture of liquid reagents, generating an expanded foam, according to which said mixture of liquid reactants is continuously introduced into a container and the mixture is allowed to expand so that, once totally expanded, the foam taken over by a U-conveyor, adopts the form of a web of rectangular cross section, characterised in that the volume of said container is determined to form a zone of retention of the mixture of reagents in liquid phase and in that the level of this mixture is maintained at a level slightly greater than the plane on which the mixture in the liquid state flows, so that the primary phase of the expansion of the mixture and its further expansion are produced outside the container on a surface subjected to a continuous movement under the effect of conveyor, which surface is maintained in a substantially horizontal plane.

The volume of the recipient is notably determined by acting on at least its length, so that the zone of retention defines the width of the web of foam.

These objects are also attained by the device according to the invention for making webs of polymer foam obtained from a mixture of liquid reagents generating an expanded foam and comprising a container, means for continuously introducing into this container said mixture of liquid reagents and a U-conveyor animated by a continuous movement on which the foam is deposited to adopt the form of a web of rectangular cross section, characterised in that the container comprises a front wall, a rear wall and two lateral walls of which the front and rear walls also constitute the bottom of the container and in that the front wall, which is located on the conveyor side is a curved wall constituted by a cylinder, displaced in rotation about a substantially horizontal axis in the same direction and at the same speed as the conveyor and in that the edges of the lateral walls, located on the curved wall side, are of circular contour and partially and intimately surround the cylinder but allow the relative movement of the cylinder and the other walls while preventing leakage from the container.

The upper edge of the rear wall and of the lateral walls of the container are located at a level higher than that of the front wall, which is tangential to a substantially horizontal surface on which the mixture of reagents in liquid phase flows, which horizontal surface is displaced by a continuous movement under the effect of the conveyor.

The assembly composed of rear wall, lateral walls, comprises means for obtaining pivoting thereof about the axis of said cylinder with a view to raising or lowering said assembly with respect to said horizontal surface in order to modify the volume of the recipient, and to immobilise said assembly in position after adjustment.

According to one embodiment, the rear wall of the recipient is a curved wall constituted by a cylinder, driven in rotation in the same direction as the front cylinder, which cylinders are mounted on two parallel axes and are substantially tangential, the line of tangency constituting the bottom of the container and in that the lateral walls are parallel to each other and are above the cylinders and their lower edge is defined by two circular lines converging at a point located in the vicinity of said line of tangency, which lateral walls partially surround the cylinders in order to allow on the one hand the rotation of the cylinders and on the other hand the relative movement of the rear cylinder/lateral wall assembly about the front cylinder whilst ensuring tightness of the container.

The rear cylinder is of larger diameter than the front cylinder and is driven in rotation at a slower speed than that of said front cylinder.

The rear cylinder is immersed in a tank of solvent and is subjected to the action of a scraper extending in the longitudinal direction of the cylinder to detach from its periphery the polymerised particles adhering thereto.

Each of the lateral walls comprises a counter-plate extending towards said horizontal surface on which is deposited the mixture of reagents in liquid phase to effect seal at the join of the lateral walls and said surface, which counter-plates are adjustable in position on the walls.

Said lateral walls comprise means for bringing them closer together or for separating them and for immobilising them in position.

At least one of said cylinders comprises a bundle of conduits parallel to one another and to the axis of rotation of the cylinder, in which conduits a heat-transfer fluid is circulated to raise or lower the temperature of the cylinder and correlatively the temperature of the mixture of reagents in liquid phase.

The curved wall constituted by said cylinder, located at the front of the recipient on the conveyor side and the rear wall of the container, define a space in which is passed a supple sheet, which winds partly around said cylinder on which it moves in the container, which sheet continues its stroke by being taken over by the conveyor and constitutes said horizontal surface on which the mixture of reagents is deposited.

In one embodiment, the supple sheet is applied against the lower part of said front cylinder, below the bottom of the recipient by means of a roller subjected to the action of elastic means.

In another embodiment, the supple sheet is applied against the lower part of the rear cylinder, below the line of tangency of the two cylinders by means of a roller subjected to the action of elastic means, which sheet is then passed between the two cylinders and partially surrounds the front cylinder via the top to extend tangentially thereto in a substantially horizontal position.

In the device according to the invention of which the mixture is introduced in the container in a stream, one feature is that it comprises at least one pipe passing through each of the lateral walls, which pipe is mounted to slide to be positioned in the casting head and comprises over its length openings to ensure distribution of the mixture in the liquid state in said head.

In a particular embodiment, the pipe is composed of a plurality of coaxial tubes, disposed in line with one another and of section decreasing with respect to the circulation of the mixture, so as to reserve therebetween annular spaces substantially of the same section, which corresponds substantially to the section of the smallest central tube.

The device according to the invention also comprises a substantially horizontal plate whose width is at least equal to that of the conveyor and of which the upper face is tangential to the front cylinder of the container which plate extends from said front cylinder up to the conveyor and supports the sheet on which the foam develops.

In said device, in which the U-conveyor is composed of a belt carrying the supple sheet on which the foam is developed and of which the lateral walls are constituted by two supple sheets, each issuing from a vertical roller located at the front of the device on the container side, which sheets extend over the length of the conveyor and wind around a vertical roller located at the rear of the device, said sheets moving at the speed of the belt by being joined at their lower edge along the lateral edges of said sheet, borne by the conveyor, one feature consists in that it further comprises, parallel and near each of the inner faces of the lateral walls of the conveyor, another inclined supple sheet, which, issuing from a roller located near said container extends over at least that part of the device where the reagents, deposited in liquid phase on said horizontal sheet, start to react and develop up to total expansion of the foam, which sheet moves in this part in a rectilinear direction from the entry towards the outlet of the device and from bottom to top to be taken over by a roller located above the conveyor, its inclination being such that its lateral edges are substantially parallel to the slope of the mixture in reaction phase in order to obtain webs of foam having a plane upper face forming with their lateral faces sharp edges having no surface defect.

The inclined parts of said sheet are located above the conveyor and the casting head and one of the parts is inclined from top to bottom and folded along a parallel rectilinear member contignous to the horizontal sheet and the other part is returned from bottom to top along the same inclination as that of the first part.

In its embodiment for making panels of rigid foam, the device according to the invention, comprising a lower conveyor bearing a supple sheet on which is deposited the mixture of reagents and a second conveyor disposed above said lower conveyor and parallel thereto and on which is applied a supple sheet on the lower side of the upper belt, which conveyors define a space which determines the thickness of the panels of rigid foam, is characterised in that the container in which the liquid reagents are introduced can be moved in the longitudinal direction of the device and comprises means to be immobilised in position with respect to the conveyors.

In this embodiment, the plate, which extends between the container and the lower conveyor, is composed of at least two plate elements of small thickness, parallel to each other and adjacent, which plate elements are telescopic to adjust the length of the plate in order to connect the container and the conveyor.

This device comprises, in the space between the lower conveyor and the upper conveyor, parallel bars disposed in the same plane, which bars are in overhang and are fixed to the structure of the device on the container side and extend towards the conveyors, so that their free end which is located between said conveyors, is substantially at the place where the foam solidifies.

Each of these bars is enveloped by a sheath slightly larger than the bar in order to be movable along said bar under the effect of the foam during expansion thereof, in order continuously to produce and define channels in the foam panels.

The invention also relates to a novel product consisting of a rigid foam panel whose large faces are coated with sheets of a protecting material, characterised in that it comprises, in its thickness, parallel channels whose peripheral wall is protected by a sheath adhering to the foam.

The advantages of the invention are at various levels:
its design is simple, easy to adapt to all types of foaming machines;
it may be used both for manufacturing supple foam and rigid foam;
it offers the possibility of continuously varying the width;
likewise the possibility of continuously varying the volume of the liquid retained before the foaming reaction starts or, according to need, the possibility of conserving this volume constant whilst changing the width; it is therefore not necessary to make an adjustment of catalysis;
it enables the temperature of the different constituents of the apparatus to be easily adjusted, such temperatures themselves being able to be different;
it is based on a sound process: no spraying, projection and excessive formation of vapour at the point of casting;
it enables the air content of the reactive mixture to be controlled;
it makes it possible to obtain a uniform layer of foam, regular over the whole width (important advantage for the plates of small thickness or continuous blocks of rectangular section);
due to elimination of the problem of the cream line, it allows simpler formulations and new raw materials can also be used;
it offers the possibility, more particularly for rigid insulating foam, of obtaining composite products with rigid facings: plaster boards, fibreboard panels, plywood, metal foils, etc . . . without having to use the so-called "reverse" process which has the serious drawback of involving heavy lateral losses of material;
it offers the possibility of laminating on supple supports: fabrics, paper, films, etc . . .
with respect to the device with fixed chute and with the exception of the mobile flanks of reduced surface, there is no zone without movement where the foam may be set and require manual detaching. The risk of "icebergs" is eliminated. The problem of cleanliness of the chute, which is very important for a regular flow, is no longer raised with the device carrying out the process according to the invention;
furthermore, the invention makes it easier to control the speed of advance of the casting conveyor. This speed may be considerably reduced and the length of the installations may be reduced accordingly, hence a considerable reduction in investment costs.

At the level of foam generator reagent production and whatever the embodiment of the container according to the invention, the upstream wall of the zone of retention, formed either by the rear cylinder or by the wall of the tank, is always at a height greater than that of the front cylinder. The front wall is constituted in its lower part by the flexible bottom support taking the form of the front cylinder and in its upper part by the cream line with the particularity that the retained volume of reactive liquid, therefore the level of flow which determines the height of the block, may be mastered to a large extent, substantially in a proportion of 1 to 2.

The substantially horizontal position of the conveyor no longer causes parasitic flow of the liquid phase beneath the expanding phase, this drawback already being shown on inclined conveyors and which requires a minimum speed. In the proposed process, the speed may be reduced as far as is allowed by the reactivity of the mixture, hence a proportional reduction of the length of the installations.

The invention offers the possibility of regulating the temperature of the cylinders or of the tank. Since the foaming reaction generates heat, it is important to be able to maintain the mixture and the apparatus at a constant temperature. A heat-transfer fluid will preferably be used, passing through the cylinders and capable of evacuating the calories produced or, on the contrary, of bringing calories, if necessary.

Experience having shown that a high temperature (50° to 60°) of the flexible bottom limited the over-densification of the base of the foam (2 to 3% saving on the matter) and that, on the contrary, a low temperature of between 17° and 20° delayed distillation of the auxiliary swelling agents (monofluotrichloromethylene), the advantage of cooling the rear cylinder and of heating the front cylinder is immediately seen.

During manufacture, it is possible to vary the width of the block of foam by displacement of the mobile flanks and, at the same time, if necessary, to change the position of the rear cylinder or the tank to maintain in the zone of retention the same volume of liquid or, on the contrary, to modify it.

The arrival of the reactive liquid may be effected either by trickling over a chute or in a stream via two lateral channels passing through the mobile flanks and each constituted by a series of concentric nozzles of sections decreasing from upstream to downstream, so that the nozzles all have the same section or similar sections to avoid any turbulence in the liquid mixture and to ensure distribution of the mixture in the container.

It is possible to integrate with the product a pulverulent or granulated, dry or impregnated filler, spread over the rear cylinder with the aid for example of a hopper and appropriate distributor. The addition of the fillers in the polyurethane foam, which has always encountered difficulties in bringing them into the mixture, is solved by this process. This feature is especially advantageous for manufacturing insulation panels of rigid foam between two facings.

The equipment as described hereinabove may easily be adapted to existing conveyors, particularly for manufacturing supple foam, without losing the advantage of the formation of the cream line on a horizontal plane.

This adaptation may be extended to the machines for producing rigid foam, called "double belt" machines, whilst conserving the option generally offered by these machines to adjust the distance between the casting head, here the retention zone, and the entrance of the double-belt conveyor.

The apparatus according to the invention further make it possible to obtain webs of supple foam of rectangular cross esection presenting no deterioration of the flanks and having a flat upper surface.

The angle of rise may be adjusted on sight and without delay;

The top face of the web is not obstructed during the degassing which marks the end of expansion;

The web is formed in free expansion over the whole of its width;

The matter being formed is under permanent visual control of the operators.

The apparatus according to the invention finally allow manufacture of the rigid foam plates. the adoption of a casting head with cylinders supplied in a stream makes it possible to place a device capable of creating longitudinal channels in the thickness of the panel being formed and thus to create a considerable saving in raw materials.

Other advantages will yet emerge from the following description of various preferred embodiments of the device according to the invention with reference to the accompanying drawing in which:

FIG. 8 is a schematic view in section of a casting head in another embodiment and comprising one cylinder. In this Figure, the container is adjusted for its contents to be maximum.

FIG. 9 is a schematic view in section of the casting head of FIG. 8, of which the container is adjusted for its contents to be minimum.

Reference will firstly be made to FIGS. 1 to 7 of the drawings which illustrate the invention in an embodiment for obtaining webs of supple polymer foam.

Figure 1:
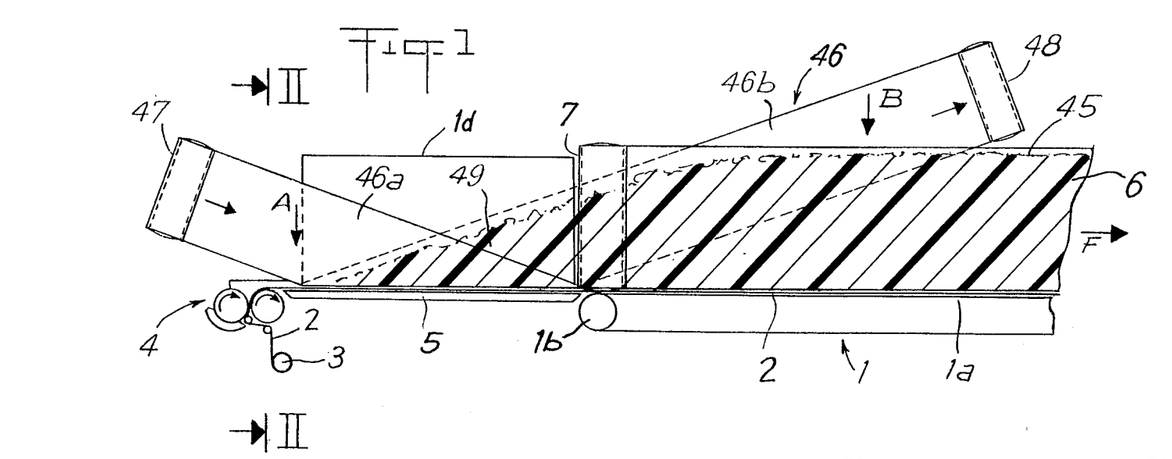
FIG. 1 is a very schematic view in elevation of a device according to the invention for manufacturing webs of supple polymer foam and comprising a casing head employing cylinders.
Figure 2:
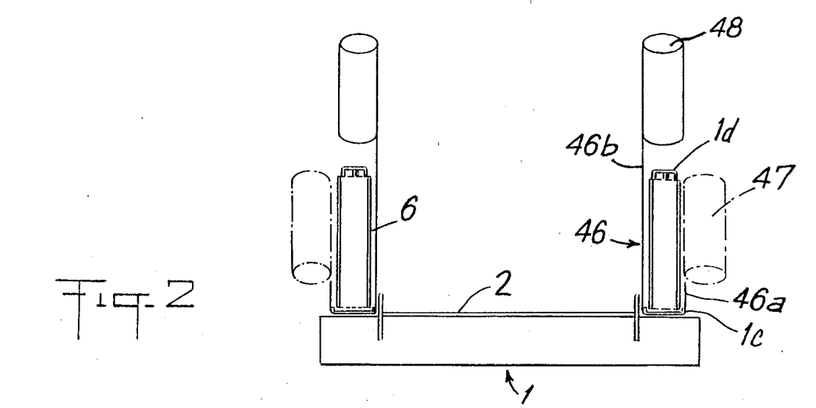
FIG. 2 is a view in section of the device of FIG. 1 along line II—II.

The device of FIG. 1 is composed of a conveyor 1, extending in a substantially horizontal plane, of which the bearing side 1a supports a supple sheet 2 issuing from a roller 3. This sheet 2, for example made of paper, is firstly passed in a casting head 4 and is slidably supported on an intermediate plate 5 disposed between the head 4 and the conveyor 1.

The plate 5 and the bearing side 1a of the conveyor 1 are substantially in the same plane. The lateral walls of the conveyor 1 are formed in known manner by supple sheets 6 issuing from two rollers 7. The rollers 7 are disposed perpendicularly to the conveyor 1 and the sheets 6 are adjacent the lateral edges of the horizontal sheet 2. The assembly of sheets 2,6 forming a U-sectioned corridor, moves at the speed of the conveyor 1 in the direction of arrow F. As shown in the drawing, the rollers 7 are for example located at the level of the front cylinder 1b of the conveyor 1. This Figure will be referred to again to complete its description concerning other arrangements according to the invention.

In one embodiment, the casing head 4 is shown in FIGS. 3 to 7 of the drawings.

Casting head designates the device in which the reagents in liquid phase are introduced with a view to mixing thereof and ensuring the function of distributor of this liquid mixture before it expands up to the final phase when it takes the consistency of a foam.

According to the invention, the process consists in determining the volume of a container to form a zone of retention of the mixture of reagents in liquid phase and the level of this mixture is maintained at a level slightly higher than the plane in which the sheet 2 moves, so that the initial phase of expansion of the mixture and its further expansion are produced outside the container, on said sheet 2, which is displaced in the direction of arrow F to bring the mixture in reaction in contact with the walls of the conveyor 2,6 which give the web of foam its final form, the latter being for example a rectangular cross section.

FIGS. 3 to 7 show a preferred embodiment of the casting head, which is composed of a container 8 constituted by two cylinders 9,10 of the same length and of two lateral walls 11. The cylinders 9,10 are of different diameters, cylinder 9 being smaller than cylinder 10. These cylinders are parallel to each other and are disposed horizontally and transversely to the conveyor 1. The cylinder 9 is located near the plate 5 and is very close to the other cylinder 10 so as to leave therebetween a slight space for the passage of a film, for example a sheet of paper 2. In this position, the cylinders are substantially tangential and the line of tangency 12 constitutes the lower end part of the container. The latter comprises two moving curved front/rear walls which are constituted by said cylinders 9,10 and lateral walls 11 which are disposed above the cylinders are parallel to one another and extend perpendicularly to the generatrices of said cylinders 9,10. Their lower part is formed by two curved edges 11a, 11b converging to point 11c, which is located in the vicinity of the edge of tangency 12. The line 11a is a circular edge of radius $R_1$ whose centre is the axis of rotation of the cylinder 10. This circular edge 11a closely follows the periphery of the cylinder 10. The edge 11b is a circular edge of radius $R_2$, whose centre is the axis of rotation of cylinder 9. The circular edge 11b follows the periphery of cylinder 9 and is in abutment on the sheet of paper 2. The curved edge 11b extends by a straight edge 11d extending above the plate 5. The upper part of cylinder 9 is substantially tangential to the plane in which the plate 5 is located and in which the supple sheet 2 moves.

Figure 3:
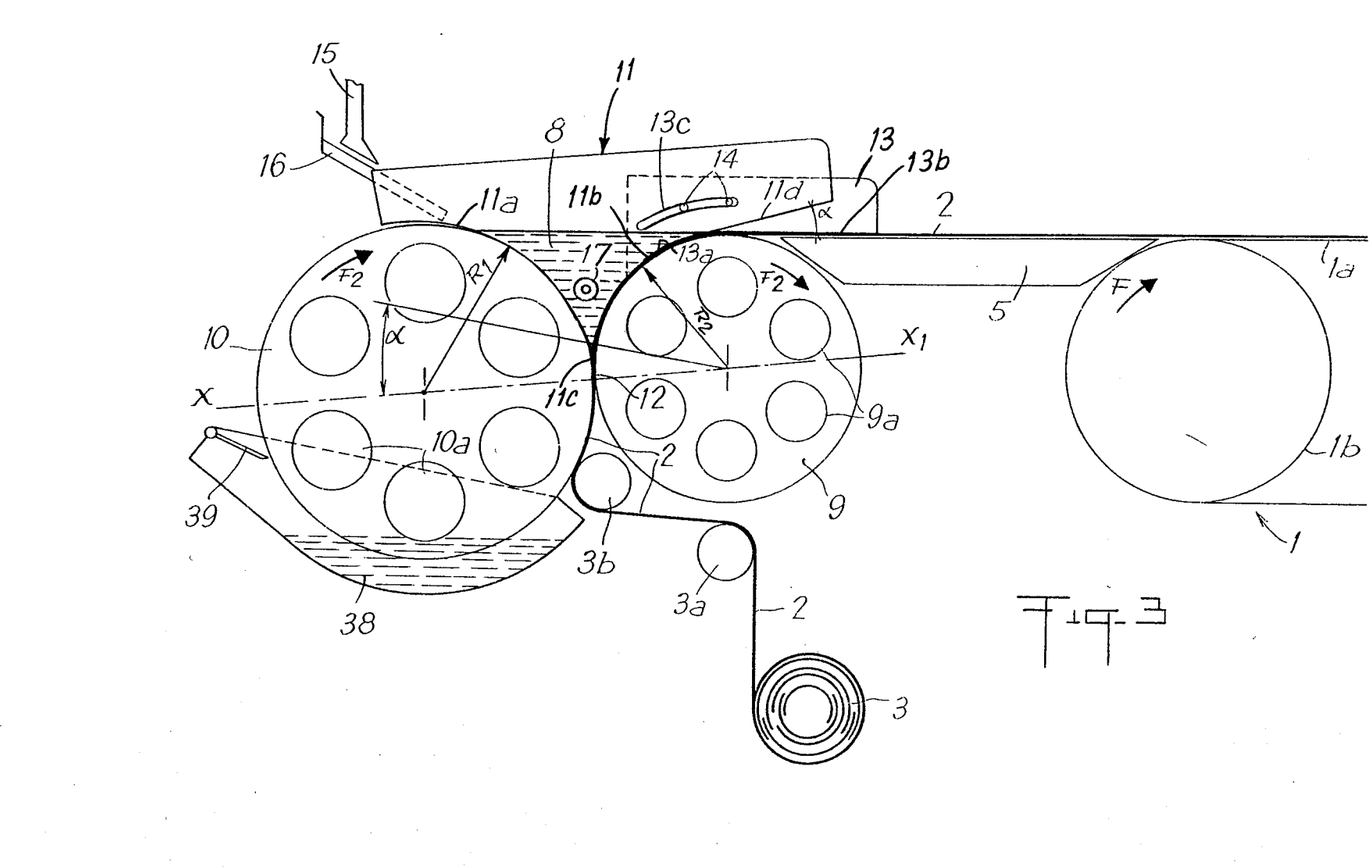
FIG. 3 is a schematic partial view in section, to a larger scale, of the front part of the device of FIG. 1, illustrating the casting head in one embodiment and in its arrangement where the retention zone is maximum.

The latter comes from a roller 3 located below the casting head, which roller is parallel to cylinders 9,10.

The sheet 2 is firstly in abutment on a first roller 3a, mounted to rotate freely on the structure of the machine and is applied against the cylinder 10 by a roller 3b. The sheet 2, issuing from the roll of paper 3, firstly partly follows cylinder 10, passes into space 12, follows the upper part of the cylinder 9 to continue its stroke horizontally on the plate 5 and the bearing side 1a of the conveyor 1.

Figure 4:
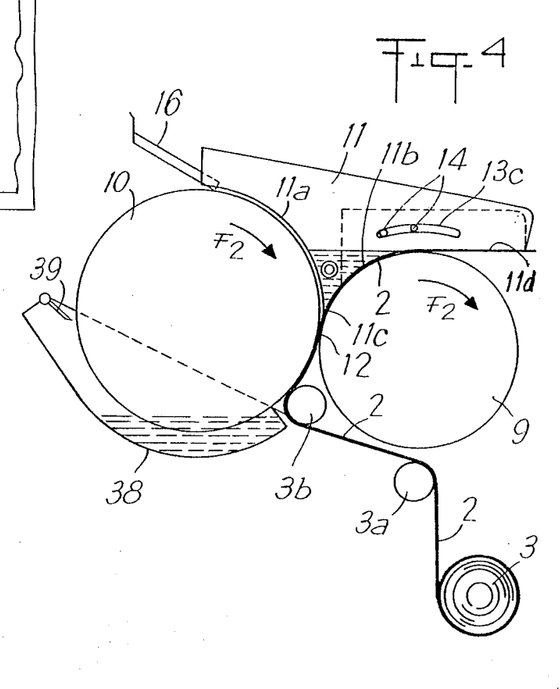
FIG. 4 is a schematic view of the casting head of FIG. 3 in its arrangement where the retention zone is minimum.
Figure 5:
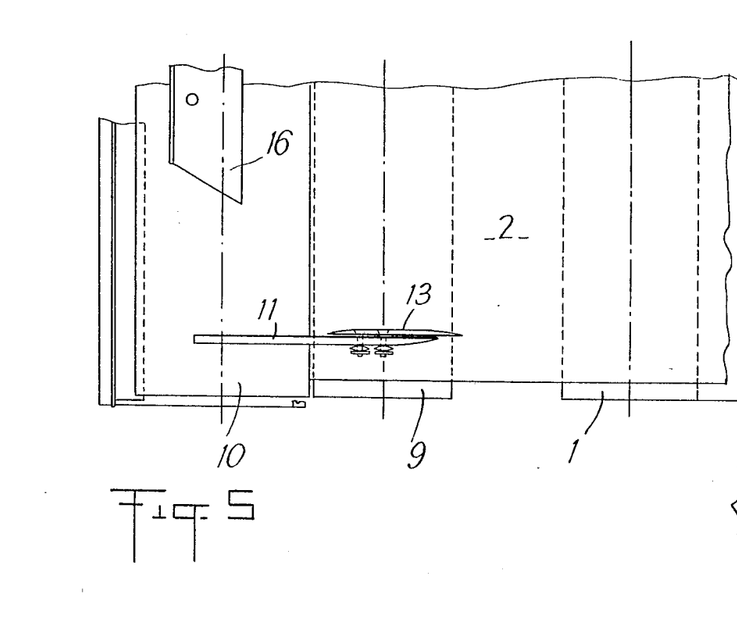
FIG. 5 is a schematic half-view in plan of the casting head of FIG. 3.

The assembly of cylinders 9,10 and lateral walls 11 is mounted to pivot about the axis of cylinder 9, so that the volume of the zone of retention of the mixture 8 may vary as a function of the angular position of said assembly. The angular clearance $\alpha$ is for example 15°. In the position illustrated in FIG. 3, the cylinder 10 being in its lower end position, the volume of the retention zone 8 is maximum. In FIG. 4, the cylinder 10 is in its top end position and the volume of said zone 8 is minimum.

As may be seen in FIG. 3, the angle formed between line 11d of said lateral walls 11 and the plane in which the sheet 2 moves is the angle $\alpha$ of clearance of the recipient, for example 15°. In order to provide seal of the recipient between the lateral walls 11 and the sheet of paper 2, each wall 11 comprises, on the plate 5 side, a counter plate 13 adapted to conceal the gap existing between line 11d and the sheet 2. This counter plate 13 comprises, in its lower part, a circular edge 13a extended by a straight line 13b. The lower edge of the plate 13 thus follows the contour of the upper part of the cylinder 9 and is extended over part of plate 5. The counter plates 13 further comprise a curved slot 13c to allow them to be positioned on the lateral walls 11 and their fixing is ensured for example by means of two bolts 14 or by any other equivalent means.

Cylinders 9,10 are driven in rotation in the direction of arrows F2 which is also the direction of the conveyor 1. The cylinder 9 is driven at the speed of the conveyor 1. Cylinder 10 rotates at a slower speed.

The liquid mixture may be introduced into the container 8 in two ways: either by means of a distribution head 15 which pours the liquid mixture over a distribution chute 16 located above the cylinder 10, or by means of two horizontal pipes 17 introducing the liquid in a stream through the lateral walls of the container. Each of these pipes passes through one of the lateral walls 11 and brings the mixture of reagents into the container without turbulence.

Figure 14:
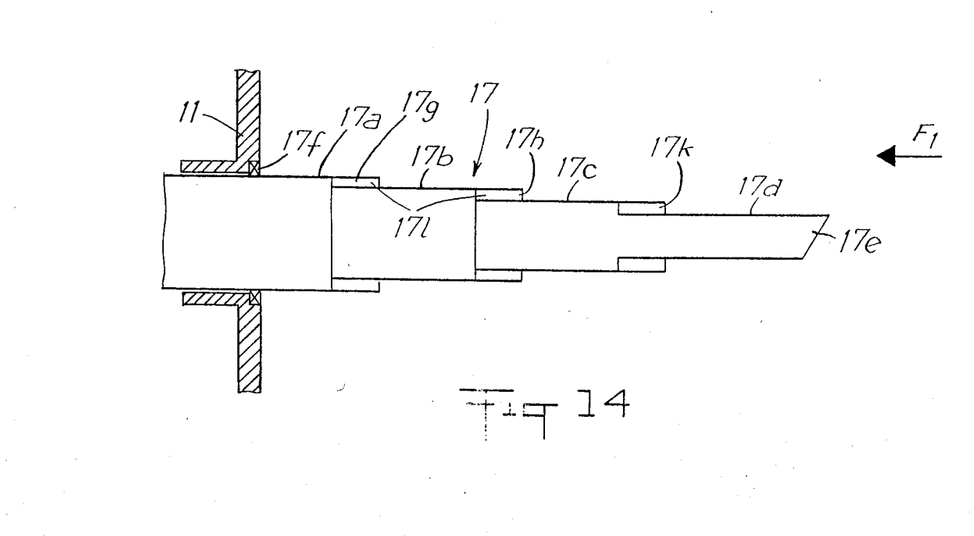
FIG. 14 is a view in longitudinal section of one of the conduits for supplying the mixture of reagents in a stream in the container employing cylinders according to the invention.
Figure 15:
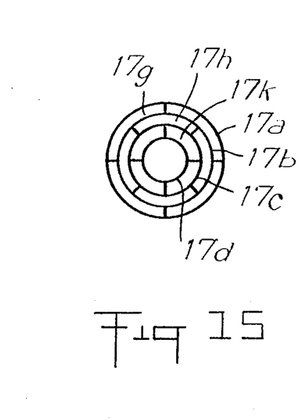
FIG. 15 is a view in the direction of $F_1$ of the conduit of FIG. 14.

One embodiment of such a pipe 17 is illustrated in FIGS. 14 and 15 of the drawings. It is composed of a plurality of coaxial tubes 17a, 17b, 17c, 17d placed in line with one another so that the end of the pipe 17e can reach the central zone of the casting head whatever the position of the lateral walls 11 with respect to the median axis of the head. This pipe is therefore adjustably mounted in the wall 11 which it passes through, and a seal, at the level of the passage therein, is obtained for example by means of a lip joint 17f allowing slide thereof. Each of the tubes 17b, 17c, 17d reserves, in combination with the one in which it is engaged and which it extends, 17a, 17b, 17c, an annular space 17g, 17d, 17k substantially of the same section, which corresponds substantially to the section of the smallest tube 17d. The positioning of the tubes with respect to one another is obtained by means of spacers 17l, distributed around the tubes. The mixture in the liquid state is thus distributed in the casting head in the same rate of flow and without turbulence through the annular spaces 17g, 17h, 17k and through the central tube 17d.

Figure 6:
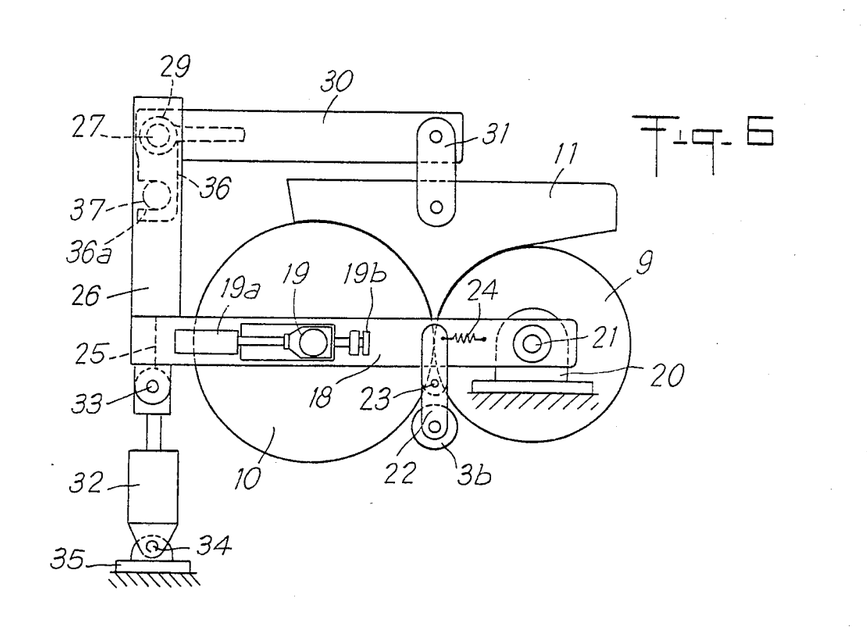
FIG. 6 is a partial elevation view of the mechanical part of the container composing the casting head.
Figure 7:
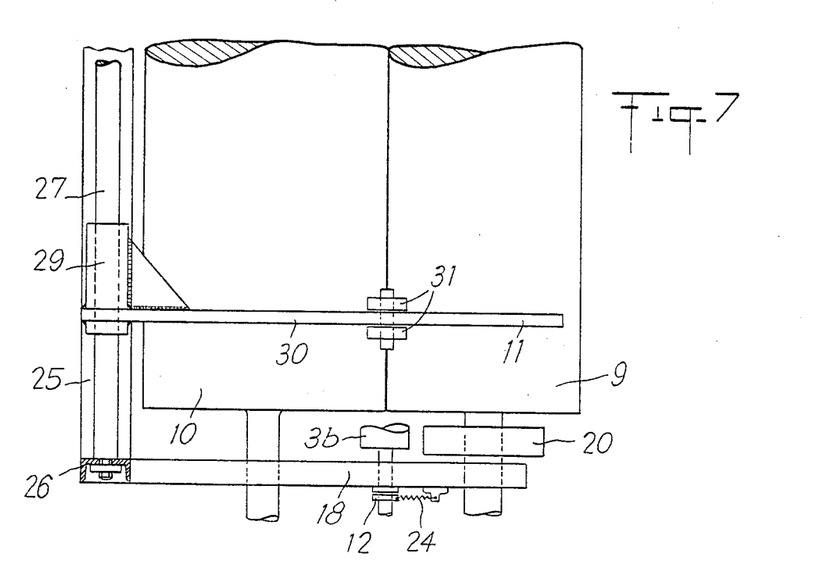
FIG. 7 is a partial plan view of the mechanism of FIG. 6.

One embodiment of the structure bearing the cylinders 9,10 and the lateral walls 11 is given with reference to FIGS. 6 and 7.

The cylinders 9,10 are rotated by being mounted on two parallel arms 18 disposed on either side of the cylinders. The large cylinder 10 is mounted in adjustable manner on the supports 18 in bearings 19 mounted on guides and comprising adjustment means 19a and stop means 19b to enable it to be moved away or closer to the cylinder 9, and to immobilise it in position.

The cylinder 9 is mounted in fixed position at one of the ends of the arms 18. The assembly is borne by bearings 20 fixed to the frame of the machine. In this design, the arms 18 and the assembly of the elements that they bear may pivot about the axis of the cylinder 9, referenced 21. The roller 3b, adapted to apply the sheet of paper against the cylinder 10, is borne by two rods 22, articulated by their centre about a pin 23 borne by a fastening element extending to the lower part of the arms. The rods 22 are subjected to the tension of a spring 24 hooked to arms 18, so that the roller 3b is pivoted on the cylinder 10 side.

The arms 18 are connected together by a crosspiece 25 and comprise two extensions 26 extending perpendicularly from bottom to top. These two extensions 26 are parallel to each other and bear in their upper part a threaded rod 27 whose thread is opposite, right/left, from its centre. This rod 27 is connected by one of its ends to means for driving it in rotation.

It cooperates with two sleeves 29 which each bear an arm 30 extending perpendicularly to the extensions 26. These arms 30 are parallel to arms 18 and bear, at their free end, rods 31 with two rods per arm, which rods form fork joints. These rods 31 are articulated on the arms 30 and also on the lateral walls 11 which form the recipient. The walls 11 thus guided are automatically placed above and around the cylinders 9,10, so that they form, in combination with said cylinders, a volume of retention of acceptable tightness.

The angular clearance of the assembly is obtained by means of one or more double acting jacks 32 preferably with hydraulic functioning, articulated on the one hand at 33 on the end of the mobile structure 18,25,26 and, on the other hand, at 34 on a fork joint 35 fixed to the frame of the equipment.

The choice of the volume of the zone of retention 8 is obtained by modifying the angle $\alpha$ of line $XX_1$ on which the cylinders 9,10 are and/or by modifying the length of the recipient by displacement of the lateral walls 11 by acting on the screw 27. The walls 11, guided in translation by the supports 30, may be brought closer to each other or spaced apart from each other symmetrically to the longitudinal axis of the device. The arm 30 is maintained parallel to the arm 18 by means of a sliding stop 36 notched at 36a which is fast therewith and which cooperates with a guide 37 extending transversely to the casting head and which is parallel to the screw 27. This stop 36 extends perpendicularly to the arm 30 and beneath the latter, each arm 30 comprises a stop.

The adjustment of the spacing of the lateral walls 11 determines the width of the web of foam obtained. The mixture of liquid reagents contained in the zone of retention 8 and of which the upper level is substantially in the plane of the plate 5 or slightly above, is taken along in the liquid state by the supple sheet 2 so that the dilation and expansion of the foam are produced outside the container on the plate 5, total expansion continuing on the conveyor 1.

With a view to maintaining the container in a good state of cleanliness, the cylinder 10 which constitutes the rear wall of the recipient, is partially immersed in a tank of solvent 38, disposed in the lower part of the casting head. This tank 38 comprises a scraper 39 extending transversely to the cylinder and maintained in position at a suitable angle for detaching from the wall of the cylinder the particles of polymerised matter which may have adhered thereto. As may be seen in the drawing, the tank 38 moves with the assembly when the volume of the retention zone 8 is adjusted and its shape is such that no solvent can overflow.

The cylinders 9,10 furthermore have conduits 9a, 10a equidistant from the axis of rotation of the cylinders and extending longitudinally, parallel to said axis of rotation. The cylinders comprise at their ends rotary seals to ensure tightness at these spots. The function of these conduits 9a, 10a is to channel a heat-transfer fluid, for example water, with a view to heating or cooling the cylinders and correlatively the mixture of reagents. This embodiment is interesting in that as the foaming reaction generates heat, it is important to maintain the mixture and the apparatus at a constant temperature. In particular, it makes it possible to control the temperature at various points of the container. For example, the rear cylinder 10 may be cooled whilst cylinder 9 may be heated. In fact, experience has shown that a temperature of 50° to 60° of the flexible bottom constituted by the supple sheet 2 limited to overdensification of the base of the foam. On the other hand, a low temperature of between 17° and 20° delayed distillation of the auxiliary swelling agents, hence the advantage of cooling the rear cylinder 10 and of heating the front cylinder 9.

Another embodiment of a casting head according to the invention is illustrated in FIGS. 8 and 9 of the drawings.

This head is composed of a cylinder 40 driven in rotation in the direction of displacement of the conveyor belt of conveyor 1 and on which cylinder 40 is applied a sheet of paper 2 coming from a reel 3. Partial winding of the sheet 2 on the cylinder 40 is obtained by means of a roller 41 extending parallel to said cylinder. As in the device described previously, the supple sheet 2 is supported by a horizontal plate 5 and is taken over by a likewise horizontal conveyor.

The cylinder 40, coated with the supple sheet 2, constitutes the front wall of the container in which the mixture of liquid reagents is introduced. The rear and bottom walls of the container and the lateral walls constitute an assembly which may pivot about the cylinder 40, remaining closely applied by the lateral walls on the supple sheet 2. Whatever the angular position of the container, its upper part is always at a level higher than the plane of the plate 5 in which the sheet 2 moves. In addition to the mobile wall constituted by the cylinder 40, the container is composed of a rear wall 42 which follows, in part, the contour of the cylinder 40 and comprises in its lower part a "return" 42a, directed towards said cylinder. A space 43 is reserved between the parts 42a and the cylinder, to allow passage of the supple sheet 2. The lateral walls 42b of the container are defined on the cylinder side by a circular line $42b_1$, which is extended to the upper part of the container by a straight line $42b_2$. In the position illustrated in FIG. 9, this straight line $42b_2$ is applied against the supple sheet 2, this ensuring tightness of the container at this spot where the mixture, in the liquid state, begins its expansion.

In order to ensure tightness of the container whatever the angular position of its part constituted by walls 42,42a, 42b, the device comprises, inside the container and against the inner faces of the lateral walls 42b, counter plates 44 whose function is to conceal the gap existing between the lateral walls 42b and the supple sheet 2, as illustrated in particular in FIG. 8. The counter plates 44 have a fixed position with respect to the cylinder 40 and comprise means for being adjusted and fixed in a determined position with respect to the lateral walls 42b of the container. They comprise a circular edge 44a extended by a straight portion 44b, so as to cooperate closely with the supple sheet 2. They adopt the form of a curved band with parallel lateral edges of which the width is greater than the maximum space E left at the level of the lateral walls 42b of the recipient.

Like the casting head described with reference to FIGS. 3 to 7, the device described in FIGS. 8 and 9 may comprise a supply as a stream in the lateral walls 42b of the container or by means of a distribution head located above the container. The lateral walls 42b may also be brought closer together or moved away from each other in order to determine the width of the web of foam to be obtained.

The temperature of the mixture of liquid reagents contained in the container may be controlled by admission into the cylinder of a heat-transfer liquid circulating in longitudinal conduits as has been described with reference to FIG. 3. As in the preceding device comprising a casting head with two cylinders, the casting head shown in FIGS. 8 and 9 makes it possible to allow the mixture of reagents to flow in the liquid state, outside the container, level with the plate 5, the extension of the foam being effected on the plate 5, terminating on the conveyor 1.

Reference will again be made to FIG. 1 of the drawings which schematically shows the progression of the mixture of reagents flowing in liquid phase at station A and which, entering in reaction, develops progressively along a regular slope to adopt at point B the final structure of a web of foam.

For the upper face 45 of the web of foam thus formed to be plane and the upper angles of the web to be substantially right angles, it is necessary to accompany the foam during its progression between points A and B to avoid the firstly viscous then pasty state of the mixture provoking against the walls of the shaper a retaining means which brakes the expansion of the cells in contact with the walls. The problem has been solved according to the invention by disposing inside the conveyor and against each of the lateral walls thereof, constituted by sheets of paper 6, a supple sheet 46, also of paper, which is unwound in an oblique direction as illustrated in FIG. 1.

The sheet of paper 46, issuing from a roller 47 located in front of and above the casting head 4 with cylinders, extends in a vertical plane firstly in a downwardly inclined direction as far as the sheet 2 borne by plate 5. The sheet 46 is then folded around a member 1d constituted by a wall of considerable thickness, of which the lower edge 1c is rectilinear and extends parallel to and contiguous to said sheet 2, so that the parts 46a and 46b move in parallel planes. Part 46b is thus inclined upwardly and winds around a reel 48 located above the shaper of the foam webs, which is constituted by the horizontal sheet 2 and by the two sheets 6 defining the lateral walls of the conveyor. The inclination of the part 46b is substantially that of the matter 49 in the course of development. The latter is taken over at station A and is accompanied up to the end of expansion at point B. Part 46a of the sheet 46 is located, with respect to the U-passage of the conveyor, behind the part 46b which is in contact with the foam. The latter continues its progress to the state of web, guided by the lateral sheets 6 until it has gelified completely.

Figure 10:
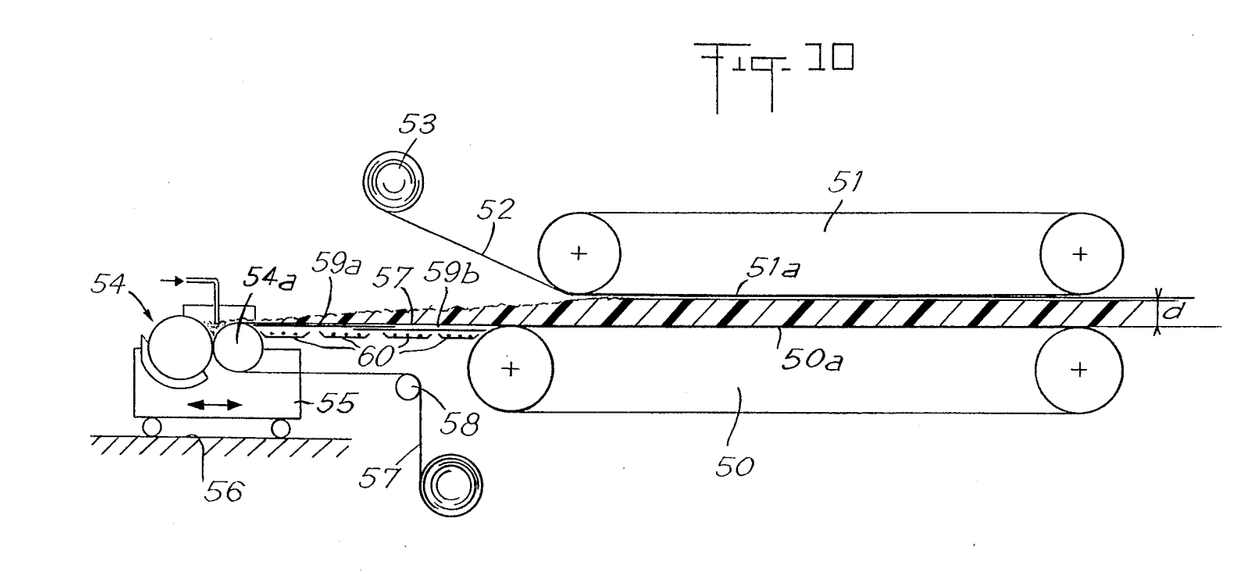
FIG. 10 is a schematic view in longitudinal section of a device according to the invention for manufacturing panels of rigid polymer foam.

Reference will now be made to FIG. 10 which illustrates a device according to the invention for manufacturing panels of rigid foam. This device is composed of a horizontal belt conveyor 50 extending in a horizontal plane above which is disposed a second conveyor 51. The two conveyors 50,51 are parallel to each other and spaced apart from each other by a distance d which corresponds to the thickness of the plate to be obtained.

The lower side 51a of the conveyor 51 is coated with a sheet, 52, for example of paper, coming from a reel 53 located in front of and above the device.

The casting head 54 employing cylinders, which is of the type as described with reference to FIGS. 3 to 7, is mounted on a carriage 55 guided by rails 56. The bearing side 50a of the lower conveyor 50 is coated with a sheet of paper 57 which, coming from a supply reel, is passed over a roller 58 and into the casting head 54, partially surrounding the front cylinder 54a thereof. The distance between the casting head 54 and the lower conveyor 50 is filled by a plate 59 constituted by two parts 59a, 59b which are telescopic. Each of these parts is constituted by a thin metal plate element, preferably of copper or aluminium, which are adjacent and superposed so as to be able to slide with respect to each other as a function of the position of the casting head 54 with respect to the conveyors. The length of the plate 59 may thus be modified in a proportion close to 1 to 2 in order to determine a zone of expansion of the mixture and to control its expansion, reheating being ensured by a set of infrared emitters 60 with adjustable positions, whose distribution is determined by the length of zone chosen.

The adoption of a casting head employing cylinders according to the invention, supplied in a stream, which eliminates the arrival of the reactive mixture by the upper part of the device, has enabled a device to be designed which is capable of creating longitudinal channels in the thickness of the panels being formed and to make a considerable saving of raw materials.

Figure 11:
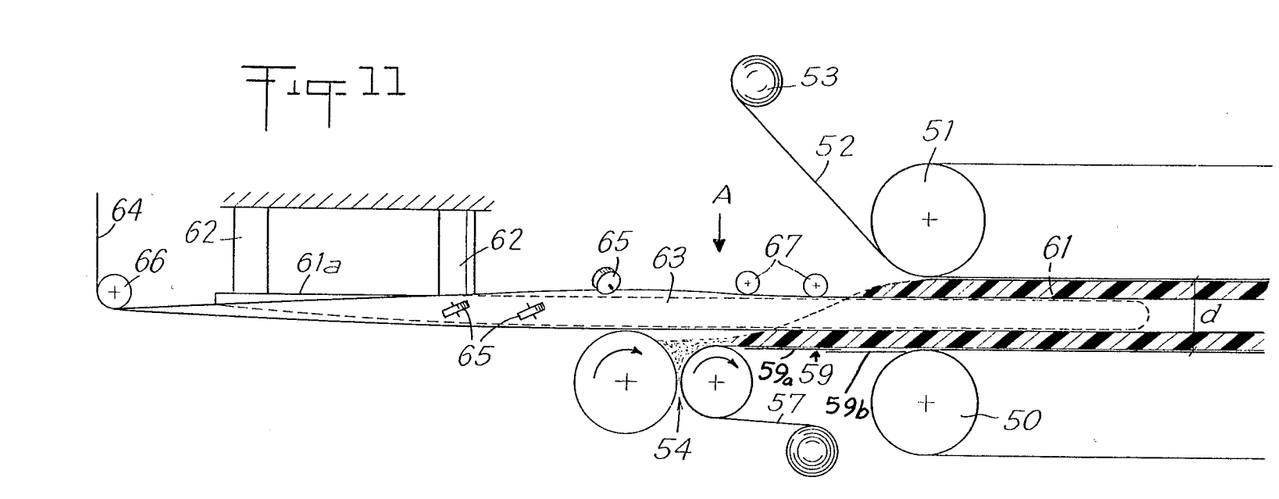
FIG. 11 is a schematic view in longitudinal section of the front part of the device of FIG. 10, comprising arrangements for obtaining rigid panels comprising longitudinal channels.
Figure 12:
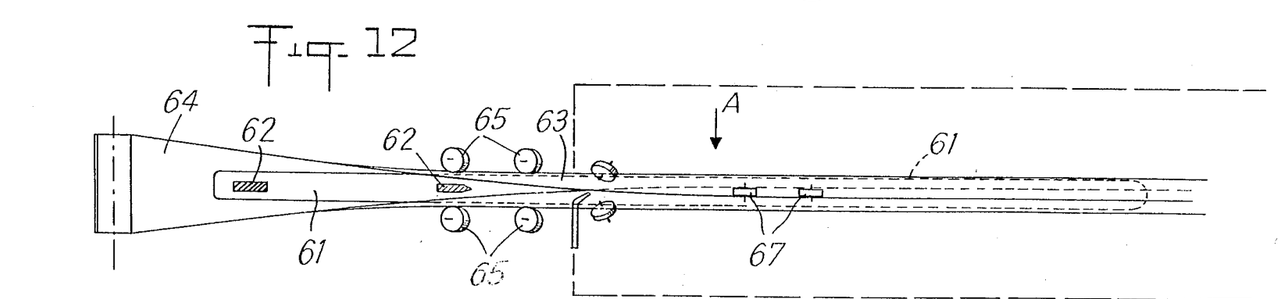
FIG. 12 is a plan view of one of the cores forming said channels and its accessories and which illustrates the production of the sheaths of the channels of the rigid panels according to one embodiment.

A device of such design is illustrated in FIGS. 11 and 12 of the drawings.

Above the casting head 54 and the zone of expansion 59 are disposed, parallel to the direction of displacement of the conveyors 50,51, bars 61 which are preferably cylindrical. These bars have a section smaller than the thickness of the panels and extend horizontally at the centre of the space d existing between the conveyors 50,51. The device comprises a plurality of parallel bars 61 which are located in the same plane. The bars 61 are fixed to the structure of the machine at supports 62 located at one of their ends and extending in overhang above the casting head 54 and between said conveyors 50,51 so that their free end is located substantially at the point where the foam takes its consistency. Said bars constitute the cores around which sheathes 63 will be formed, said sheathes obtained from webs of paper 64 or of polyethylene film for example, continuously folded by means of conical forming rollers 65 according to a known principle.

Upstream of each bar 61 is disposed a roller 66 on which the sheet 64 is in abutment from underneath. The roller 66 is disposed so that the sheet is tangential to the bar 61 at its lower part. Said bar has a smaller section in its part 61 to accompany the sheet 64 before it is placed in contact with the shaper rollers 65. The latter are disposed so as to place one of the edges of the sheet in overlapping position on the other, as illustrated in FIG. 12. The sheath thus constituted at station A is closed by gluing or by welding by means of two rollers 67 which apply the edges on each other. The sheathes are taken along at the same speed as the conveyors 50,51 initially by means of a seizing member and then by the material itself by adherence thereof on the sheathes. The foam in formation develops around the sheathes 63 between the conveyors 50,51 up to total expansion.

Figure 13:
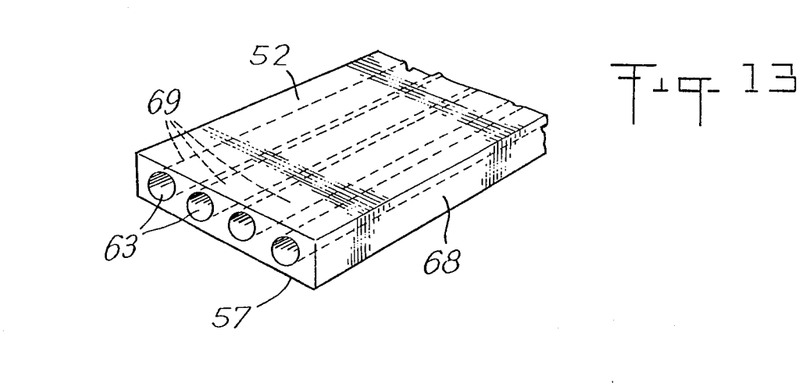
FIG. 13 is a partial view in perspective of a panel of rigid foam according to the invention.

The panel obtained at the outlet of the conveyors comprises parallel longitudinal channels defined by said sheathes. A panel thus obtained is illustrated in FIG. 13 of the drawings. The layer of foam 68 calibrated in thickness between the two conveyors 50,51 is protected on the large faces of the panel by sheets of paper 52,57. The channels 69 formed by the cores 61 adopt the shape of the latter and extend in the longitudinal direction of the panel.

In FIG. 13, the example shown comprises channels 69 of circular cross section, of which the peripheral wall is defined and protected by the sheathes 63 which adhere to the foam. It is specified that the sheathes 63 may also be constituted by rigid tubes of cardboard or plastics material.

To obtain panels comprising such rigid sheathes, the latter are brought successively around the cores 61. The sheathes are split along a generatrix and are brought successively to be engaged at the end 61a of the cores 61 and, as described above, are then taken along by adherence of the product being formed conveyed by the conveyor.

I claim:

1. Apparatus for producing webs of polymer foam obtained from a mixture of liquid reagents generating an expanded foam and comprising a container, means for continuously introducing into said container said mixture of liquid reagents and a U-conveyor having a movable and continuously travelling surface on which the foam is deposited to adopt the foam of a web of rectangular cross-section, the container comprises a front wall, a rear wall and two lateral walls wherein lower parts of the rear wall and the front wall approach each other and define a bottom of the container, and the front wall, which is located on the conveyor side, is a curved wall constituted by a cylinder driven in rotation about a horizontal axis in the same direction and at the same speed as the conveyor, and the edges of the lateral walls adjacent the curved wall are circular in contour and partially surround the cylinder in order to allow the relative movement of the cylinder and the said rear and lateral wall to ensure tightness of the container and an assembly composed of the rear wall and lateral walls comprises means for obtaining its pivoting about the axis of said cylinder with a view to raising or lowering said assembly with respect to a horizontal surface in order to modify the volume of the container and to immobilize said assembly in a position after adjustment.

2. Apparatus according to claim 1, in which the upper edge of the rear wall and the lateral walls of the container are located at a level higher than that of the front wall, wherein said front wall is tangential to a horizontal surface constituted by a film on which the mixture of reactants in liquid phase flows, which film is moved continuously by the conveyor.

3. Apparatus according to claim 2, wherein the rear wall of the container is the curved wall of a cylinder driven in rotation in the same direction as the front cylinder, which cylinders are mounted on two parallel axes and are substantially tangential, the line of tangency constituting the bottom of the container, and the lateral walls are parallel to each other and are above the cylinders and their lower part is defined by two circular edges converging at a point located in the vicinity of said line of tangency, which lateral walls partially and intimately surround the cylinders but allow the rotation of the cylinders, and the relative movement of the rear cylinder lateral wall assembly about the front cylinder while preventing leakage from the container.

4. Apparatus according to claim 3, wherein the rear cylinder has a diameter larger than the front cylinder and is driven in rotation at a slower speed than that of said cylinder.

5. Apparatus according to claim 3 or 4, wherein the rear cylinder is immersed in a tank of solvent and is subjected to the action of a scraper extending in the longitudinal direction of the cylinder to detach from its periphery the polymerized particles adhering thereto.

6. Apparatus according to claim 3, wherein each of the lateral walls comprises a counter plate extending towards said horizontal surface on which is deposited the mixture of reactants in liquid phase to effect tightness at the joint of the lateral walls and said surface, which counter plates are adjustable in position on the walls.

7. Apparatus according to claim 1 or 3, wherein at least one of said cylinders has conduits equidistant from the axes of rotation of the cylinders, in which conduits is circulated a heat transfer fluid for raising or lowering the temperature of the cylinder and correlatively the temperature of the mixture of reactants in liquid phase.

8. Apparatus according to claim 3, wherein the curved wall, constituted by said cylinder located at the front of the container on the conveyor side, and the rear wall of the container, define a space in which is passed a supple sheet which winds partially around said cylinder and is displaced towards said conveyor on which cylinder it moves in the container, which sheet continues its path, taken over by the conveyor, and constitutes said horizontal surface on which the mixture of reactants is deposited.

9. Apparatus according to claim 8, wherein the supple sheet is applied against the lower part of said cylinder below the bottom of the container by means of a roller subjected to the action of elastic means.

10. Apparatus according to claim 8 or 9, wherein the supple sheet is applied against the lower part of the rear cylinder below the line of tangency of the two cylinders by means of a roller subjected to the action of elastic means, which sheet is then passed between the two cylinders and partially surrounds the front cylinder by the top to extend tangentially thereto in a substantially horizontal position.

11. Apparatus according to claim 1 or 3, comprising at least one pipe passing through each of the walls, which pipe is slidably mounted to be positioned in the casting head and comprises over its length openings to ensure distribution of the mixture in the liquid state in the casting head.

12. Apparatus according to claim 11, wherein the pipe is composed of a plurality of coaxial tubes disposed in line with one another and of a section decreasing with respect to the circulation of the mixture, so as to reserve therebetween annular spaces substantially of the same section, which corresponds substantially to the section of the smallest central tube.

13. Apparatus according to claim 1 or 3, in which the U-conveyor is comprised of a belt bearing the supple sheet on which the foam develops and in which the lateral walls are constituted by two supple sheets, each issuing from a vertical roller located at the front of the device on the container side, which sheets extend over the length of the conveyor and wind around another vertical roller located at the device, which sheets move at the speed of the belt, being joined at their lower edge along the lateral edges of said sheet carried by the conveyor, wherein said device further comprises, parallel and near each of the inner faces of the lateral walls of the conveyor, another inclined supple sheet which issues from a roller located towards said container and extends over at least that part of the device where the reagents deposited in liquid phase on said horizontal sheet enter in reaction and develop up to total expansion of the foam, which sheet moves in this part in a rectilinear direction from the inlet towards the outlet of the device and from bottom to top to be taken over by the roller located above the conveyor, its inclination being such that its lateral edges are substantially parallel to the slope of the mixture in reaction phase in order to obtain webs of foam having a flat upper face forming with their lateral faces sharp edges having no surface defect.

14. Apparatus according to claim 13, wherein the inclined sheet is folded along a rectilinear member parallel and contiguous to the horizontal sheet and comprises two parts, a first part located on the side of said casting head which is inclned downwardly towards said folded part, and a second part which is returned upwardly with the same inclination as that of said first part and towards the outlet of the apparatus.

15. Apparatus according to claim 1 or 3 for manufacturing panels of rigid foam and comprising a lower conveyor bearing a supple sheet on which is deposited the mixture of reagents, and a second conveyor disposed above said lower conveyor and parallel thereto and on which is applied a supple sheet on the lower edge of the upper belt, which conveyors define a space which determines the thickness of the panels of rigid foam, wherein the container where the liquid reagents are introduced is displaceable in the longitudinal direction of the apparatus and comprises means to immobilize said container in position with respect to the conveyor.

16. Apparatus according to claim 15, wherein the plate which extends between the container and the lower conveyor is composed of at least two elements of small thickness, parallel to each other and adjacent, which elements are telescopic to adjust the length of the plate in order to connect the container and the conveyor.

* * * * *